US012752242B2

(12) United States Patent
Noda et al.

(10) Patent No.: US 12,752,242 B2
(45) Date of Patent: Oct. 6, 2026

(54) METHOD FOR DRYING SEPARATION MEMBRANE AND METHOD FOR PRODUCING SEPARATION MEMBRANE STRUCTURE

(71) Applicant: NGK Insulators, Ltd., Nagoya (JP)

(72) Inventors: Kenichi Noda, Nagoya (JP); Takeshi Hagio, Inazawa (JP)

(73) Assignee: NGK INSULATORS, LTD., Nagoya (JP)

( * ) Notice: Subject to any disclaimer, the term of this patent is extended or adjusted under 35 U.S.C. 154(b) by 78 days.

(21) Appl. No.: 18/056,806

(22) Filed: Nov. 18, 2022

(65) Prior Publication Data

US 2023/0078309 A1 Mar. 16, 2023

Related U.S. Application Data

(63) Continuation of application No. 16/387,932, filed on Apr. 18, 2019, now Pat. No. 11,534,724, which is a (Continued)

(30) Foreign Application Priority Data

Nov. 8, 2016 (JP) ................................ 2016-218366

(51) Int. Cl.
*B01D 67/00* (2006.01)

(52) U.S. Cl.
CPC ......... *B01D 67/0095* (2013.01); *B01D 67/00* (2013.01); *B01D 2311/103* (2013.01)

(58) Field of Classification Search
CPC ................ B01D 67/00; B01D 67/0095; B01D 53/26–28; B01D 2311/103;
(Continued)

(56) References Cited

U.S. PATENT DOCUMENTS 2,999,803 A 9/1961 Duval, Jr.
3,308,096 A 3/1967 Ivanov et al.
(Continued)

FOREIGN PATENT DOCUMENTS

JP S60-216811 A1 10/1985
JP H04-256423 A1 9/1992
(Continued)

OTHER PUBLICATIONS

Sun-Tak Hwang, "Fundamentals of Membrane Support," Korean J. Chem. Eng., 28(1), 2011, pp. 1-15.
(Continued)

*Primary Examiner* — T. Bennett Mckenzie
(74) *Attorney, Agent, or Firm* — Muncy, Geissler, Olds & Lowe, P.C.

(57) ABSTRACT

A drying method for a separation membrane includes supplying a gas for drying to the separation membrane so that a value obtained by dividing the difference between a maximum value and a minimum value of a flow rate of the gas for drying on a membrane surface of the separation membrane by the minimum value of the flow rate is less than or equal to 15%. The gas for drying is less than or equal to 40 degree C. and contains a water-soluble gas that has a solubility in 1 $cm^3$ of water of greater than or equal to 0.5 $cm^3$ in conditions of 40 degree C. and 1 atmosphere.

2 Claims, 4 Drawing Sheets

Related U.S. Application Data continuation of application No. PCT/JP2017/035949, filed on Oct. 3, 2017.

(58) Field of Classification Search
CPC .............. B01D 69/108; B01D 2311/04; B01D 2311/14; B01D 2311/16
USPC ............................................................ 34/402
See application file for complete search history.

(56) References Cited

U.S. PATENT DOCUMENTS

| | | | | |
|---|---|---|---|---|
| 3,762,290 | A | 10/1973 | Harvey | |
| 3,914,435 | A | 10/1975 | Maubois et al. | |
| 4,421,529 | A * | 12/1983 | Revak | C01B 13/0255 96/8 |
| 4,583,996 | A * | 4/1986 | Sakata | B01D 63/02 95/52 |
| 4,627,606 | A | 12/1986 | Moore | |
| 4,659,343 | A * | 4/1987 | Kelly | B01D 53/22 210/640 |
| 5,004,482 | A * | 4/1991 | Haas | C01B 21/0438 95/52 |
| 5,182,868 | A | 2/1993 | Porta et al. | |
| 5,370,721 | A | 12/1994 | Carnahan | |
| 5,762,690 | A * | 6/1998 | Hermann | B01D 53/268 96/406 |
| 7,708,463 | B2 | 5/2010 | Sampaio Camacho | |
| 2004/0112219 | A1* | 6/2004 | Leffel | F02M 35/10019 96/108 |
| 2007/0028773 | A1* | 2/2007 | Jain | B01D 53/02 95/135 |
| 2007/0245473 | A1* | 10/2007 | Seibt | B64D 11/02 4/301 |
| 2010/0212504 | A1 | 8/2010 | Shimizu et al. | |
| 2012/0024777 | A1 | 2/2012 | Sugita et al. | |
| 2012/0282654 | A1 | 11/2012 | Yao et al. | |
| 2015/0060372 | A1 | 3/2015 | Krause et al. | |
| 2015/0096442 | A1 | 4/2015 | Sims et al. | |
| 2017/0259214 | A1 | 9/2017 | Onozuka et al. | |
| 2019/0010042 | A1 | 1/2019 | Krüger et al. | |
| 2020/0278704 | A1* | 9/2020 | Liu | G01F 1/00 |
| 2021/0164684 | A1* | 6/2021 | Takenaka | F25B 13/00 |

FOREIGN PATENT DOCUMENTS

| | | | | |
|---|---|---|---|---|
| JP | H10-202071 | A1 | 8/1998 | |
| JP | 2001-133155 | A1 | 5/2001 | |
| JP | 2008-237946 | A1 | 10/2008 | |
| JP | 2010-089000 | A1 | 4/2010 | |
| JP | 2012-246207 | A1 | 12/2012 | |
| JP | 2014-058433 | A1 | 4/2014 | |
| JP | 2014-208334 | A1 | 11/2014 | |
| JP | 2016-104486 | A1 | 6/2016 | |
| JP | 2016-159211 | A1 | 9/2016 | |
| JP | 2016159211 | A * | 9/2016 | |
| WO | WO-2004035181 | A1 * | 4/2004 | B01D 63/0233 |
| WO | 2016/084845 | A1 | 6/2016 | |

OTHER PUBLICATIONS

International Search Report and Written Opinion (Application No. PCT/JP2017/035949) dated Dec. 5, 2017.

English translation of International Preliminary Report on Patentability (Chapter I) (Application No. PCT/JP2017/035949) dated May 23, 2019.

* cited by examiner

METHOD FOR DRYING SEPARATION MEMBRANE AND METHOD FOR PRODUCING SEPARATION MEMBRANE STRUCTURE

CROSS REFERENCE TO RELATED APPLICATIONS

This application is a continuation of U.S. application Ser. No. 16/387,932, filed Apr. 18, 2019, which is a continuation of International Application No. PCT/JP2017/035949, filed Oct. 3, 2017, which designated the United States, the entireties of which are incorporated herein by reference.

FIELD OF THE INVENTION

The present invention relates to a method for drying a separation membrane and to a method for producing a separation membrane structure.

BACKGROUND OF THE INVENTION

Conventionally, separation membranes have been put to practical use in many fields such as the chemical industry, the electronic industry, the pharmaceutical industry or the like. A gas separation membrane includes the use of a zeolite membrane, a silica membrane, a carbon membrane, and a polymer membrane or the like depending on the size of the gas molecules to be separated.

Since the pores of this type of separation membrane are fine, for example, pores tend to become blocked by water that is adsorbed from the air during assembly of the separation membrane into a casing or during storage. When a pore is blocked, since gas permeation is inhibited and sufficient membrane performance is not enabled, it is necessary to dry the separation membrane after assembly.

Known examples of a drying method of a separation membrane includes a method of heating the casing of the separation membrane (reference is made to Japanese Patent Application Laid-Open No. 2012-246207), a method for supplying heated gas to the separation membrane (reference is made to Japanese Patent Application Laid-Open No. 2016-104486), and a method of drying the separation membrane after wetting with a lower alcohol mixed solution (reference is made to Japanese Patent Application Laid-Open No. 60-216811).

Furthermore, a drying method is known whereby gas is supplied to a plurality of tubular separation membranes (reference is made to Japanese Patent Application Laid-Open No. 2016-159211).

SUMMARY OF THE INVENTION

However, the method disclosed in Patent Literature 1 and 2 requires a device for heating the casing or the gas, and the method disclosed in Patent Literature 3 requires a device for supplying the lower alcohol mixed solution. Furthermore, in Patent Literature 4, no consideration is given to which gases have properties that are adapted to drying of the separation membrane in addition to the fact that the gas flow on the membrane surface is uneven and time is required until the drying is completed because the method disclosed in Patent Literature 4 uses baffle plates.

The present invention is proposed in light of the circumstances described above, and the purpose of providing a drying method that enables simple and rapid drying of a separation membrane and a method for producing a separation membrane structure that uses that drying method.

Solution to Problem

The drying method for a separation membrane according to the present invention has a step of supplying a gas for drying to the separation membrane so that a value obtained by dividing the difference between the maximum value and the minimum value of the flow rate of the gas for drying on a membrane surface of the separation membrane by the minimum value of the flow rate is less than or equal to 15%. The gas for drying is less than or equal to 40 degree C. and contains a water-soluble gas that has a solubility in 1 $cm^3$ of water of greater than or equal to 0.5 $cm^3$ in conditions of 40 degree C. and 1 atmosphere.

The present invention enables the provision of a drying method that enables simple and rapid drying of a separation membrane and a method for producing a separation membrane structure that uses that drying method.

DETAILED DESCRIPTION OF THE INVENTION

Configuration of Separation Membrane Module 100

Figure 1:
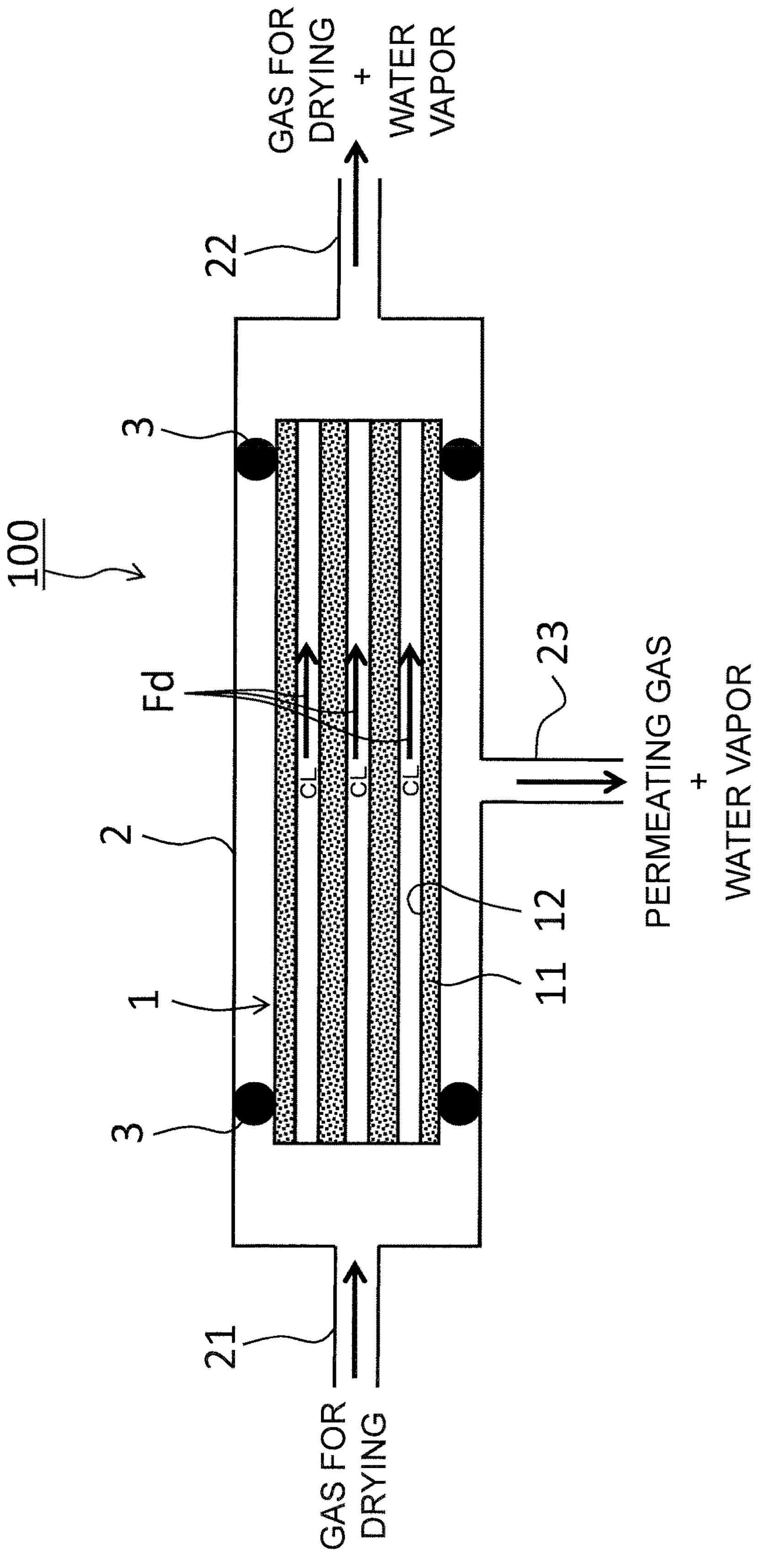
FIG. 1 is a sectional view illustrating a separation membrane module according to an aspect.

FIG. 1 is a sectional view illustrating a separation membrane module 100. The module 100 includes a separation membrane structure 1, a casing 2 and an O-ring 3.

The separation membrane structure 1 has a monolithic configuration. A monolithic configuration denotes a shape in which a plurality of cells penetrates in a longitudinal direction and includes a concept such as a honeycomb. In addition to a monolithic shape, although the shape of the separation membrane structure 1 may be tubular, cylindrical, columnar, prismatic, a flat plate or the like, a monolithic shape is suitable since it increases the membrane surface area per unit volume or can reduce the flow rate distribution.

The separation membrane structure 1 is disposed inside the casing 2. The casing 2 is provided with a supply passage 21, a first recovery passage 22 and a second recovery passage 23. Both end portions of the separation membrane structure 1 are sealed by the O-rings 3.

The separation membrane structure 1 comprises a porous support 11 and a separation membrane 12.

Porous Support 11

The porous support 11 has a monolithic shape that extends in a longitudinal direction. A plurality of cells CL is formed inside the porous support 11. Each cell CL extends longitudinally. Each cell CL is formed in a cylindrical shape. Each cell CL is connected to both end surfaces of the porous support 11.

The porous support 11 is composed of a binder and an aggregate. The aggregate includes use of alumina, silicon carbide, titania, mullite, potsherd, and cordierite or the like. The binder includes use of at least one of an alkali metal and alkaline earth metals, and a glass material containing aluminum (Al) and silicon (Si). The content ratio of the binder in the substrate 11 can be greater than or equal to 20 vol % and less than or equal to 40 vol %, and preferably greater than or equal to 25 vol % and less than or equal to 35 vol %.

Although there is no particular limitation in relation to the porosity of the porous support 11, for example, it may be configured as 25% to 50%. The porosity of the porous support 11 may be measured by mercury intrusion porosimetry. Although there is no particular limitation in relation to the average pore diameter of the porous support 11, it can be set to 0.1 μm~50 μm. Depending on the size of the pore diameter, the average pore diameter of the porous support 11 may be measured by mercury intrusion porosimetry, an air flow method described in ASTM F316, or by perm porometry.

2. Separation Membrane 12

The separation membrane 12 is formed on the inner surface of each cell CL. The separation membrane 12 is formed in a cylindrical shape. The separation membrane 12 enables permeation of a permeation component that is contained in the mixed fluid.

The separation membrane 12 includes a zeolite membrane (for example, reference is made to Japanese Patent Application Laid-Open No. 2004-66188), a silica membrane (for example, reference is made to the pamphlet of PCT Laid Open Application 2008/050812 pamphlet), a carbon membrane (for example, reference is made to Japanese Patent Application Laid-Open 2003-286018), an organic-inorganic hybrid membrane (for example, reference is made to Japanese Patent Application Laid-Open 2013-203618), and a ceramic membrane (for example, reference is made to Japanese Patent Application Laid-Open 2008-246304), or the like.

The average pore diameter of the separation membrane 12 may be suitably determined based on the required filtration performance and separation performance, and for example may be configured as 0.0002 μm~1.0 μm. The drying method of the present application exhibits superior utility when drying a separation membrane that has an average pore diameter of less than or equal to 10 nm, and is particularly useful for drying a separation membrane that has an average pore diameter of less than or equal to 1 nm.

A suitable method for measurement of the average pore diameter of the separation membrane 12 may be selected in response to the size of the pore diameter. For example, when the separation membrane 12 is a zeolite membrane, the average pore diameter is taken to be the arithmetic average of the major diameter and the minor diameter of an oxygen n-membered ring pore having a framework forming the pores of the zeolite that is constituted by rings of less than or equal to a value n of the oxygen n-membered ring. The oxygen n-membered ring has a number n of oxygen atoms that configure the framework forming the pore, includes at least one of an Si atom, Al atom or P atom, and is a part that forms a ring structure in which the respective oxygen atoms are bound with a Si atom, an Al atom, a P atom, or the like. When the zeolite has a plurality of oxygen n-membered ring pores in which n takes the same value, the average pore diameter of the zeolite is taken to be the arithmetic average of the major diameter and the minor diameter of all the oxygen n-membered ring pores. In this manner, the average pore diameter of a zeolite membrane can be uniquely calculated with reference to the values disclosed in The International Zeolite Association (IZA) "Database of Zeolite Structures" [online], [searched Nov. 21, 2014], Internet <URL: http://www.iza-structure.org/databases/>.

When the separation membrane 12 is a silica membrane, a carbide membrane or an organic-inorganic hybrid membrane, the average pore diameter can be calculated based on Formula (1) below. In Formula (1), $d_p$ denotes the average pore diameter, f denotes the normalized Knudsen permeance, $d_{k,i}$ denotes the diameter of the molecule used in Knudsen diffusion testing, and $d_{k,He}$ denotes the diameter of a helium molecule.

$$f=(1-d_{k,i}/d_p)^3/(1-d_{k,He}/d_p)^3 \tag{1}$$

The details of the calculation method for the average pore diameter or Knudsen diffusion testing are disclosed in Hye Ryeon Lee (et. al., (four others)), "Evaluation and fabrication of pore-size-tuned silica membranes with tetraethoxydimethyl disiloxane for gas separation", AlChE Journal, Volume 57, Issue 10, 2755-2765, October 2011.

For example, when the separation membrane 12 is a ceramic membrane, the average pore diameter can be calculated using perm porometry or nano-perm porometry depending on the size of the pore diameter.

Method of Producing Separation Membrane Structure 1

An example of a method for producing a separation membrane structure 1 will be described.

1. Preparation of Porous Support 11

Firstly a clay is prepared by adding water, a dispersant and an organic binder such as methyl cellulose to an aggregate and a binder, and then kneading.

The green body for the porous support 11 is formed using the prepared clay in a slip casting molding, press molding, or extrusion molding using a vacuum extruder.

Then, the green body for the porous support 11 is fired (for example, 500 degrees C. to 1500 degrees C., 0.5 hours to 80 hours) to thereby form a porous support 11 having a plurality of cells CL.

2. Preparation of Separation Membrane 12

A separation membrane 12 is formed on an inner surface of each cell CL of the porous support 11. The formation of the separation membrane 12 may include use of a method that is adapted to the type of membrane in the separation membrane 12.

3. Assembly and Drying of Separation Membrane 12

O-rings 3 are attached to both end portions of the porous support 11 including the separation membrane 12, and is enclosed in an inner portion of the casing 2.

At that time, pores tend to be blocked by water in the air that is adsorbed by the pores of the separation membrane 12. When a pore is blocked, sufficient membrane performance cannot be exhibited, and it is necessary to dry the separation membrane 12 after assembly. Therefore, in the present embodiment, the following drying treatment is performed.

Specifically, while supplying a gas for drying from the supply passage 21 to an inner portion of the casing 2, the gas for drying that has passed along the respective drying gas flow paths is recovered from the first recovery passage 22 and the permeating gas for drying that has permeated the separation membrane 12 is recovered from the second recovery passage 23. In the present embodiment, the supply of the gas for drying is performed continuously or intermittently. The amount of the gas for drying that is used may be suppressed by intermittent supply of the gas for drying.

In this step, the gas for drying is supplied to the separation membrane 12 for a predetermined time so that the flow rate distribution of the gas for drying on the membrane surface of the separation membrane 12 is less than or equal to 15%. The flow rate distribution is calculated as a flow rate of the gas for drying in proximity to the membrane surface (about 1 to 2 mm from the membrane surface) in all membrane surface positions of the separation membrane 12 on the side supplied with the gas for drying in a configuration in which there is an equal pressure on a first main surface S1 side (reference is made to FIG. 2, not illustrated in FIG. 1) and a second main surface S2 side (reference is made to FIG. 2, not illustrated in FIG. 1) of the separation membrane 12, and is calculated as a value obtained by dividing the difference between the maximum value of the membrane surface flow rate and the minimum value of the membrane surface flow rate by the minimum value of the membrane surface flow rate ([maximum flow rate−minimum flow rate]/minimum flow rate). The pressure on the first main surface Si side and the second main surface S2 side of the separation membrane 12 can be made equal by sealing the second recovery passage 23 for the permeating gas. When the membrane surface flow rate varies over time for example during intermittent supply of the gas for drying, an average value for the membrane surface flow rate during supply of the gas for drying is taken to be the value for the membrane surface flow rate.

The whole of the separation membrane 12 can be dried as approximately the same rate by setting the flow rate distribution to be less than or equal to 15%. Therefore, the separation membrane 12 can be dried efficiently in a short time by a configuration that reduces the difference in the drying rate over the whole of the separation membrane 12. The flow rate distribution is preferably less than or equal to 10%. It is noted that when there are difficulties associated with the measurement of the actual membrane surface flow rate, the flow rate distribution may be measured by use of a flow simulation.

A flow rate distribution of less than or equal to 15% is preferably imparted by disposing the separation membrane 12 so that the gas for drying flows in a substantially parallel on the membrane surface of the separation membrane 12 and by substantially equalizing the shape of a drying gas flow path in a cross section that is vertical to the flow direction of the gas for drying at any given portion of the membrane surface.

The drying gas flow path is a space in which the gas for drying flows. The drying gas flow path is provided to make contact with the separation membrane 12. In the present embodiment, the drying gas flow path is a space on an inner side of the separation membrane 12. In FIG. 1, the flow direction of the gas for drying that flows in the drying gas flow path is denoted as Fd. In the example shown in FIG. 1, the shape of the drying gas flow path in a cross section that is orthogonal to the flow direction Fd of the gas for drying is a circle that has the same approximate size across the whole of the flow direction.

Furthermore, as shown in FIG. 1, when there is a plurality of drying gas flow paths, it is preferred that the average value of the shortest distance between adjacent drying gas flow paths in a cross section that is orthogonal to the flow direction Fd of the gas for drying is less than or equal to 5 mm. In this manner, it is possible to further reduce the flow rate distribution in each drying gas flow path.

In the present embodiment, the water-soluble gas is a gas that has a solubility in 1 $cm^3$ of water of greater than or equal to 0.5 $cm^3$ in conditions of 40 degree C. and 1 atmosphere. This type of water-soluble gas includes $CO_2$, acetylene and $H_2S$, or the like. However, $CO_2$ is particularly preferred in light of safety and ease of acquisition. Although there is no particular limitation in relation to a gas other than a water-soluble gas (water-insoluble gas) for inclusion in the gas for drying, dry air, nitrogen, or argon are suitable in light of ease of acquisition and price.

One type or two or more types of a type of water-soluble gas may be included in the gas for drying. Furthermore, one type or two or more types of a type of water-insoluble gas may be included in the gas for drying.

Although a water-soluble gas may be included in the gas for drying, the rate of the drying treatment can be increased by increasing the content ratio of the water-soluble gas. More specifically, the content ratio of the water-soluble gas is preferably greater than or equal to 10 mol %, more preferably greater than or equal to 20 mol %, and still more preferably greater than or equal to 50 mol %. The gas for drying may substantially include only the water-soluble gas. It is noted that when two or more types of water-soluble gases are included in the gas for drying, the sum of the content ratios of each water-soluble gas is taken to be the content ratio of the water-soluble gas.

The kinetic diameter of at least one type of water-soluble gas molecular included in the gas for drying is preferably less than or equal to the average pore diameter of the separation membrane 12. In this manner, it is possible to efficiently cause permeation of the water-soluble gas as described below. The value for the kinetic diameter of the water-soluble gas molecular is disclosed in D. W. Breck, "Zeolite Molecular Sieves: Structure, Chemistry and Use", John Wiley & Sons, New York, 1974, p. 636.

The temperature of the gas for drying may be less than or equal to 40 degrees C. When the gas for drying is less than or equal to 40 degrees C., it means that an active heating treatment has not been performed on the gas for drying. As a result, there is no requirement for the provision of heating equipment additionally to the drying equipment for the separation membrane. In addition, since the gas for drying is less than or equal to 40 degrees C., the dissolution amount into the water of the water-soluble gas as described below can be increased. Furthermore, although there is no particular limitation on the lower limit for the temperature of the gas for drying, a value of greater than or equal to −20 degrees C. is preferred, greater than or equal to 0 degrees C. is more preferred, and greater than or equal to 10 degrees C. is particularly preferred in order to increase the rate of the drying treatment.

The gas for drying preferably does not include water content. More specifically, the water content ratio in the gas for drying is preferably less than or equal to 2 $g/m^3$, more preferably less than or equal to 0.1 $g/m^3$, and still more preferably less than or equal to 0.03 $g/m^3$.

The predetermined time (that is to say, the drying time) for supply of the gas for drying is suitably set taking into consideration the type of water-soluble gas, the content ratio of the water-soluble gas in the gas for drying, and the temperature of the gas for drying, or the like.

The pressure of the gas for drying at the drying commencement time (that is to say, the time for commencing supply of the gas for drying) is preferably higher than the drying gas pressure at drying completion time (that is to say, when supply of the gas for drying is stopped when there is continuous supply of the gas for drying to the separation membrane 12, or immediately prior to re-starting supply of the gas for drying after stopping supply of the gas for drying when there is intermittent supply of the gas for drying to the separation membrane 12). In this manner, since the flow amount of the gas for drying associated with drying of the separation membrane 12 can be decreased by reducing the pressure of the gas for drying upon completion of the drying treatment, unnecessary use of the gas for drying can be avoided. It is noted that when there is intermittent supply of the gas for drying to the separation membrane 12, the pressure of the gas for drying upon completion of the drying treatment in each supply cycle may be lower than the pressure of upon commencement of drying.

Figure 2:
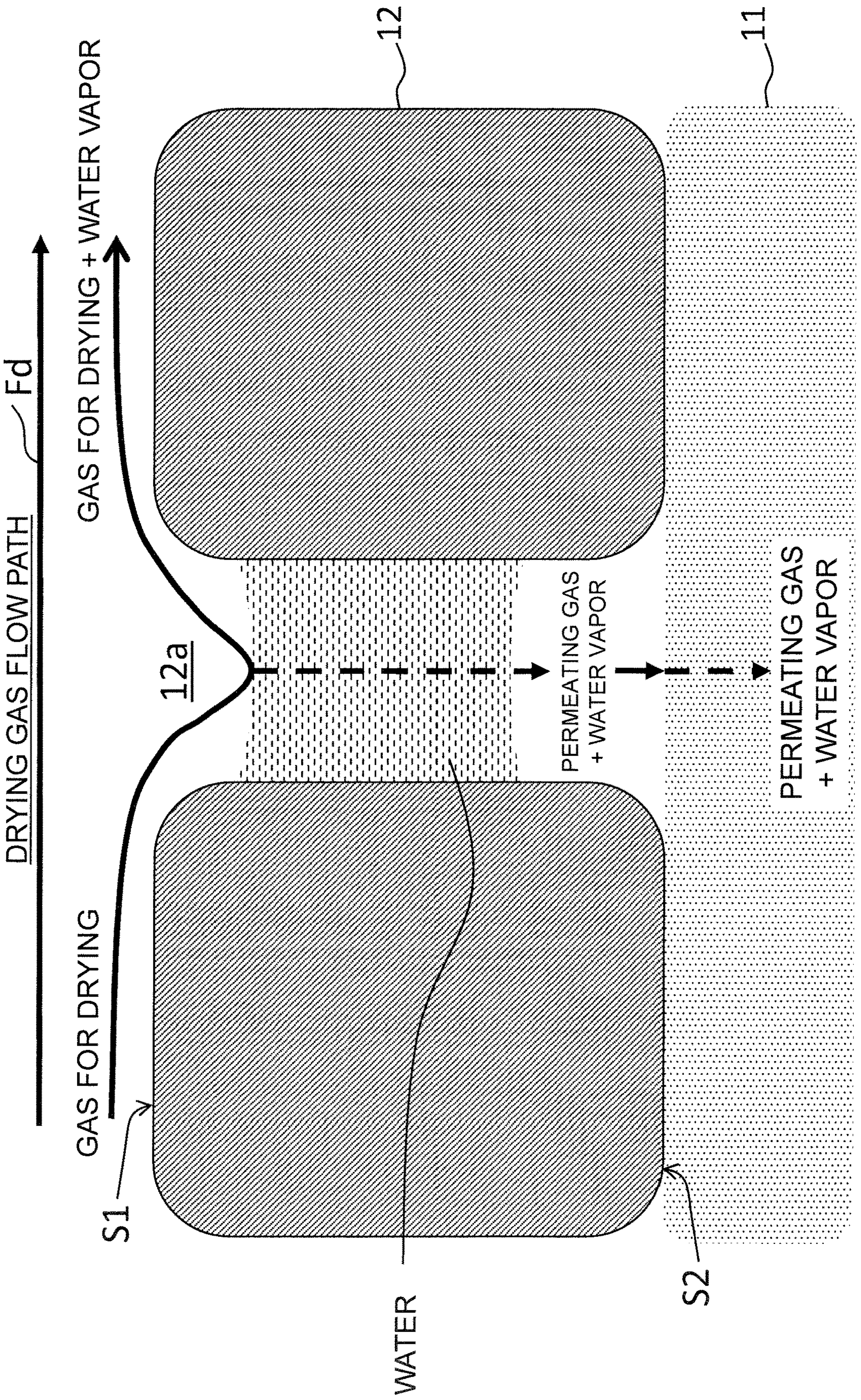
FIG. 2 is a schematic view illustrating evaporation of water due to a drying treatment.

In this context, FIG. 2 is a schematic view illustrating evaporation of water due to a drying treatment. FIG. 2 is an illustration of a configuration in which the pores 12*a* of the separation membrane 12 are blocked by water.

As shown in FIG. 2, the gas for drying is supplied to the first main surface Si of the separation membrane 12. The water-soluble gas included in the gas for drying dissolves into the water in the pores 12*a* and permeates to the second main surface S2 side. At that time, the water that blocks the pores 12*a* is evaporated as water vapor. Furthermore, although not shown, when there are pores which is not blocked by water in the separation membrane 12 or when there are pores from which water that blocked the pores of the separation membrane 12 has been removed by drying, a water-soluble gas and a water-insoluble gas included in the gas for drying can permeate through those pores to the second main surface S2 side. The permeating gas is taken to be the combination of the water-soluble gas and water-insoluble gas that permeates to the second main surface S2 side as a result of the above two configurations. The permeating gas is recovered from the second recovery passage 23 after permeating through the porous support 11 together with the water vapor that has evaporated from the water that blocks the pores 12*a*.

Gas for drying that did not permeate the separation membrane 12 makes contact with the water and then passes through the cells CL together with the water vapor that has evaporated from the water. The water vapor and the gas for drying that has passed the cells CL is recovered from the first recovery passage 22.

The drying method according to the present embodiment enables rapid and simple drying of the separation membrane 12 and avoids a heating treatment at a temperature higher than 40 degrees C. since the effect of vaporization of water that blocks the pores 12*a* from both the first main surface Si side and the second main surface S2 side is increased by the permeation of a water-soluble gas through the pores 12*a* that had been blocked by water.

The partial pressure of the water-soluble gas on the first main surface Si side (referred to below as "first partial pressure") that is supplied with the gas for drying in the drying method according to the present embodiment is preferably higher than the partial pressure of the water-soluble gas on the second main surface S2 side (referred to below as "second partial pressure"). In this manner, there is a further increase in the rate of drying of the separation membrane 12 since the water-soluble gas is efficiently dissolved into the water that blocks the pores 12*a*.

The first partial pressure is particularly preferably greater than or equal to 20 kPa higher than the second partial pressure. The pressure difference between the first partial pressure and the second partial pressure may be easily controlled by adjusting the pressure applied to the gas for drying that is supplied from the supply passage 21. Furthermore, the pressure difference between the first partial pressure and the second partial pressure may be controlled by producing a negative pressure on the second main surface S2 side by applying suction from the second recovery passage 23 by use of a vacuum pump.

The completion of the drying treatment above completes the separation membrane structure 1.

Other Embodiments

Although an embodiment of the present invention has been described, the present invention is not limited to the above embodiment, and various modifications are possible within a scope that does not depart from the spirit of the invention.

Figure 3:
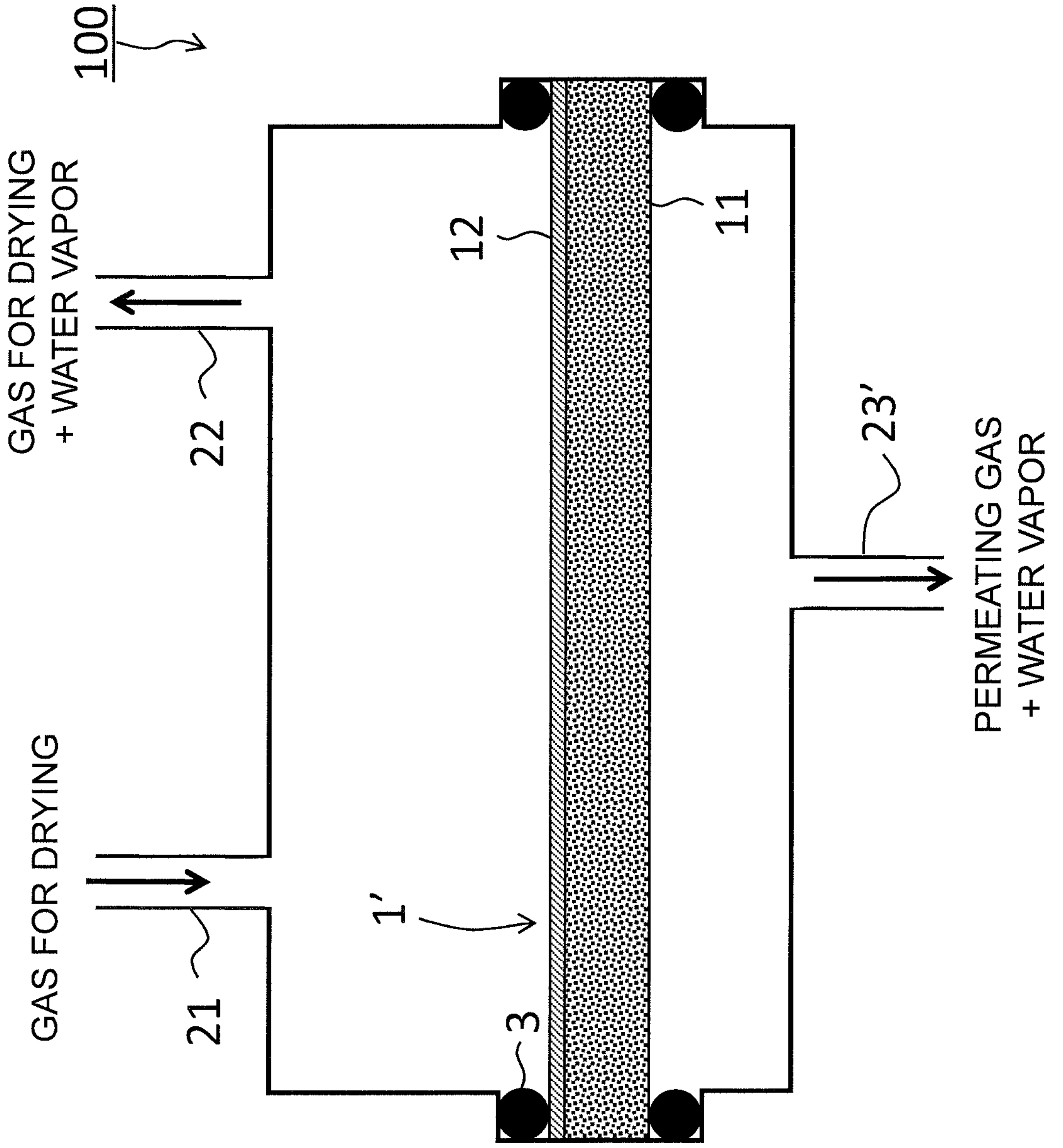
FIG. 3 is a sectional view illustrating another separation membrane module.

In the present embodiment, although a configuration has been described in which the drying method according to the present invention was applied to a monolithic separation membrane structure 1, there is no limitation in this regard. The drying method according to the present invention may be applied to a separation membrane structure having various shapes such as a tubular shape, cylindrical shape, circular columnar shape, prism, flat plate, or the like. For example, FIG. 3 is an illustration of a configuration in which there is application of the drying method according to the present invention to a flat plate shaped separation membrane structure 1'. However, when the shape of the separation membrane structure is other than monolithic (for example, tubular, or the flat plate configuration illustrated in FIG. 3, or the like) there are difficulties associated with reducing the flow rate distribution since it is difficult to equalize the flow path shape when the separation membrane structure is actually mounted on a casing.

Figure 4:
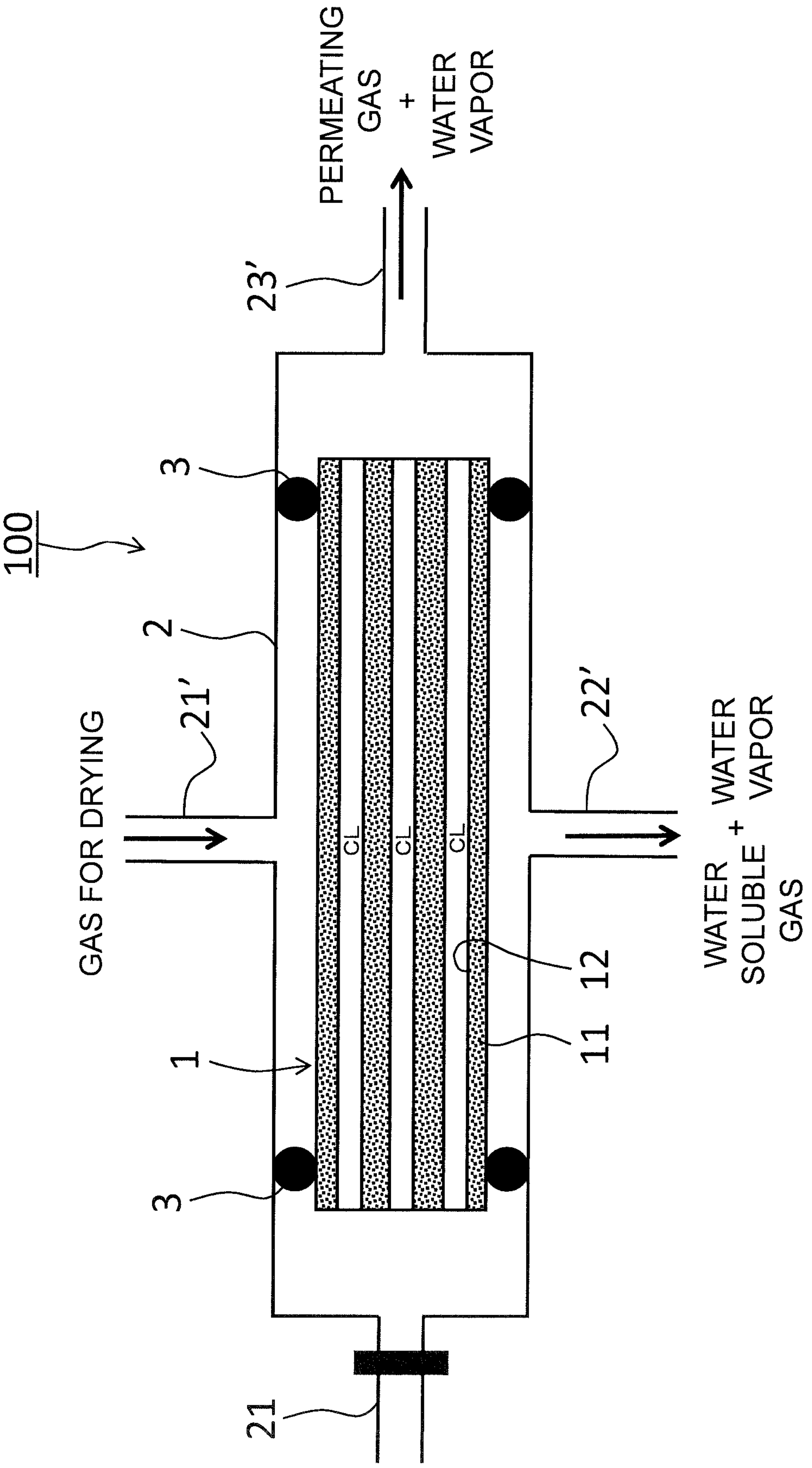
FIG. 4 is a schematic view illustrating another drying method.

In the present embodiment, although the gas for drying was supplied to the first main surface S1 of the separation membrane 12, there is no limitation in this regard. For example, as illustrated in FIG. 4, the gas for drying may be supplied to the second main surface S2 of the separation membrane 12. That is to say, the gas for drying may be supplied from the porous support 11 side to the separation membrane 12. In this configuration, as illustrated in FIG. 4, a supply passage 21' is added to the casing 2 and the supply passage 21 may be closed. The water-soluble gas that is contained in the gas for drying supplied from the supply passage 21' is recovered though the cells CL from a second recovery passage 23' after passing through water that blocks the pores 12*a* of the separation membrane 12. The remaining gas for drying is recovered from a first recovery passage 22'. However, as shown in FIG. 4, when the gas for drying is introduced in a substantially vertical configuration relative to the membrane surface of the separation membrane 12, since it is difficult to reduce the flow rate distribution, as illustrated in FIG. 1, it is preferred to reduce the flow rate distribution by introducing the gas for drying in a substantially parallel relative to the membrane surface of the separation membrane.

In the present embodiment, although the gas for drying was supplied continuously to the separation membrane 12, the gas for drying may be supplied intermittently to the separation membrane 12. More specifically, a cycle may be repeated in which after the gas for drying has filled an inner portion of the casing 2, the supply passage 21 and the first recovery passage 22 are closed, permeating gas and water vapor are recovered from the second recovery passage 23, and then the gas for drying in the casing 2 is replaced. In this configuration, the amount of gas for drying that is used during the drying treatment of the separation membrane 12 can be reduced. Furthermore, the recovered gas for drying and permeating gas can be dehumidified and reused.

In the present embodiment, although the separation membrane 12 was directly formed onto the porous support 11, one or a plurality of intermediate layers may be disposed between the separation membrane 12 and the porous support 11. The intermediate layers may be configured with the same material as the porous support 11. The pore diameter of the intermediate layers is preferably smaller than the pore diameter of the porous support 11.

EXAMPLES

Samples No. 1 to 5

Firstly 30 vol % of an inorganic binder was added to 70 vol % of alumina particles (aggregate) having an average particle diameter of 12 μm. Then there was further addition of a molding auxiliary agent such as an organic binder or the like and a pore forming agent, dry mixing were performed, a surfactant and water were added, and the mixture was mixed and kneaded to prepare a clay. The inorganic binder mixed talc, kaolin, feldspar, clay or the like having an average particle diameter of 1 to 5 μm to form a composition of $SiO_2$ (70 mass %), $Al_2O_3$ (16 mass %), alkali earth metals and alkali metals (11 mass %) was used.

Next, the clay was extrusion molded to thereby prepare a green body for a monolithic porous support. Then, the green body for the porous support was fired (1250 degrees C., one hour) to thereby obtain an alumina base material having a plurality of cells.

Next, PVA (organic binder) was added to an alumina powder to prepare a slurry and thereby form a green body for the intermediate layer on an inner surface of the cells of the alumina base material by a filtration method using the slurry. Then the green body for the intermediate layer was fired (1250 degrees C., 1 hour) to form the intermediate layer.

Next, both end surfaces of the alumina base material were sealed with glass. In this manner, a monolithic porous support was completed.

Next, a separation membrane was formed with reference to the method disclosed in International Publication WO2011105511 in which a DDR-type zeolite membrane (average pore diameter: 4.0 nm) was formed on an intermediate layer of an inner surface of each cell of a porous support. The DDR-type zeolite membrane was exposed to water vapor for one minute to thereby regenerate a configuration in which water in the air was absorbed by the DDR-type zeolite membrane.

Next, in Sample No. 1 to No. 4, a porous support formed by a DDR-type zeolite membrane was set into a casing as illustrated in FIG. 1, and in Sample No. 5, a porous support formed by a DDR-type zeolite membrane was set into a casing as illustrated in FIG. 4.

Next, a drying treatment for the DDR-type zeolite membrane was performed by causing flow of a gas for drying. The drying conditions are shown in Table 1. In Sample No. 1 and No. 5, $CO_2$ which is a water-soluble gas was used as the gas for drying, and in Sample No. 2 to No. 4, He, $N_2$ and Ar which are water-insoluble gases were used as the gas for drying. The temperature of the gas for drying was standardized at 27 degrees C. (room temperature). Furthermore in Sample No. 1, the pressure difference between the permeation side and the supply side of the gas for drying (water-soluble gas) was executed in three patterns being 10 kPa, 20 kPa, and 100 kPa, and in Sample Nos. 2 to 5, the pressure difference between the permeation side and the supply side of the gas for drying (water-insoluble gas) was fixed at 100 kPa. Furthermore, in Sample No. 1, two patterns were executed by varying the shape of the supply path to obtain a flow rate distribution of 10% and 15% at a pressure difference of 100 kPa. In the present example, since a single component gas was used as the gas for drying, the pressure difference between the permeation side and the supply side was the same as the partial pressure difference of the water-soluble gas or the water-insoluble gas. Furthermore, in Sample Nos 1 to 4, it was confirmed that the size of the flow rate distribution was less than or equal to 15%, whereas in Sample No. 5, the size of the flow rate distribution was greater than 15%.

The flow amount of each gas was taken to be 100% when the flow amount of the gas permeating the DDR-type zeolite membrane became to be constant, and the drying time was taken to be from the time at which drying gas flow started until the flow amount of each gas permeating the DDR-type zeolite membrane reached 95%. The drying time for each sample is summarized in Table 1. It is noted that the flow amount of gases permeating the DDR-type zeolite membrane was measured using a gas flow meter.

TABLE 1

| | Drying Conditions | | | | | | | |
|---|---|---|---|---|---|---|---|---|
| | | Gas for Drying | | | Supply-side | Permeation-side | Partial | Drying Time until |
| Sample No. | Flow Rate Distribution (%) | Gas Type | Solubility in 1 $cm^3$ of water at 40° C. and 1 atmosphere ($cm^3$) | Kinetic Diameter (nm) | Pressure (kPa) | Pressure (kPa) | Pressure Difference (kPa) | Gas Permeation Amount at least 95% (min) |
| 1 | 10 | $CO_2$ | 0.53 | 0.33 | 201 | 101 | 100 | 5 |
| | 15 | | | | 201 | 101 | 100 | 7 |
| | 15 | | | | 121 | 101 | 20 | 14 |
| | 15 | | | | 111 | 101 | 10 | 18 |
| 2 | 15 | He | 0.0084 | 0.26 | 201 | 101 | 100 | 24 |
| 3 | 15 | $N_2$ | 0.012 | 0.36 | 201 | 101 | 100 | 30 |
| 4 | 15 | Ar | 0.027 | 0.34 | 201 | 101 | 100 | 31 |
| 5 | 31 | $CO_2$ | 0.53 | 0.33 | 201 | 101 | 100 | 20 |

As shown in Table 1, based on a comparison of the drying time when the flow rate distribution was fixed and the partial pressure difference was fixed at 100 kPa, Sample No. 1 in which a water-soluble gas ($CO_2$) having a solubility in 1 $cm^3$ of water of greater than or equal to 0.5 $cm^3$ in conditions of 40 degree C. and 1 atmosphere enabled a reduction in the drying time in comparison to Sample No. 2 to No. 4 which used a water-insoluble gas. This result is due to the fact that water that blocked the pores of the DDR-type zeolite membrane could be vaporized from both surfaces of the DDR-type zeolite membrane.

Furthermore, based on a comparison of the drying time when the partial pressure difference was fixed at 100 kPa, Sample No. 1 in which the flow rate distribution was less than or equal to 15% enabled a reduction in the drying time in comparison to Sample No. 5 in which the flow rate distribution was greater than 15%. Furthermore it was confirmed that a flow rate distribution of less than or equal to 10% in Sample No. 1 enabled drying at a gas permeation amount of greater than or equal to 95% within 5 minutes. This result is due to the fact that efficient drying of the whole membrane was enabled by drying the whole of the DDR-type zeolite membrane at substantially the same rate.

Furthermore, based on a comparison of the drying time when the flow rate distribution was fixed and the partial pressure difference was varied in Sample No. 1, it was confirmed that drying at a gas permeation amount of greater than or equal to 95% within 15 minutes was enabled when the partial pressure difference was greater than or equal to 20 kPa.

Furthermore, the fact that the drying time in Sample No. 2 was shorter than the drying time in Sample No. 3 and No. 4 is considered to be due to the fact that since the smaller kinetic diameter of He is smaller than the kinetic diameter of $N_2$ or Ar, He tends to permeate the pores more easily than $N_2$ or Ar. However, since the drying time could be reduced in Sample No. 1 which used $CO_2$ that has a larger kinetic diameter than He, it was confirmed that solubility in water had a larger effect on the drying time than the kinetic diameter. It is clear that the same reduction in the drying time was obtained in Sample No. 1 since the same effect was obtained from a configuration in which a water-soluble gas other than $CO_2$ was used due to the fact that there is a large effect on the drying time due to solubility in water.

Since the drying time was shortened by permeation of a water-soluble gas through water that blocked the pores, it is clear that the drying time could be shortened when using a gas for drying that included 2 or more water-soluble gases. Furthermore, even when using a gas for drying that included 2 or more water-soluble gases, it is clear that the drying time was shortened as the partial pressure of the water-soluble gas on the supply side was increased to be higher than the partial pressure of the water-soluble gas on the permeation side.

Furthermore, although the present example used a separation membrane that was configured as a DDR-type zeolite membrane, the drying method used in relation to Sample No. 1 is effective in relation to a separation membrane configured by a material that tends to absorb water into pores. In particular, the drying method used in relation to Sample No. 1 is effective in relation to a separation membrane configured by a material in which the pore diameter is less than or equal to 10 nm.

The invention claimed is:

1. A drying method for a separation membrane comprising:

supplying a gas for drying to the separation membrane; wherein the gas for drying is less than or equal to 40° C. and contains a water-soluble gas that has a solubility in 1 $cm^3$ of water of greater than or equal to 0.5 $cm^3$ in conditions of 40° C. and 1 atmosphere, adjusting a pressure of the gas for drying on a first main surface side of the separation membrane upon completion of the drying method to be lower than a pressure of the gas for drying on the first main surface of the separation membrane at commencement of the drying method, wherein the separation membrane is one selected from the group consisting of a zeolite membrane, a carbon membrane, an organic-inorganic hybrid membrane and a ceramic membrane, wherein a flow rate distribution in proximity to all first main surface side positions of the separation membrane when supplying the gas for drying to the first main surface of the separation membrane is less than or equal to 15%, the flow rate distribution being calculated by dividing the difference between a maximum value and a minimum value of a flow rate of the gas for drying in proximity to all first main surface side positions of the separation membrane by the minimum value of the flow rate, and wherein a content ratio of the water-soluble gas in the gas for drying is greater than or equal to 10 mol %.

2. A drying method for a separation membrane comprising:

supplying a gas for drying to the separation membrane; wherein the gas for drying is less than or equal to 40° C. and contains a water-soluble gas that has a solubility in 1 $cm^3$ of water of greater than or equal to 0.5 $cm^3$ in conditions of 40° C. and 1 atmosphere, adjusting a pressure of the gas for drying on a first main surface side of the separation membrane upon completion of the drying method to be lower than a pressure of the gas for drying on the first main surface of the separation membrane at commencement of the drying method, wherein a flow rate distribution in proximity to all first main surface side positions of the separation membrane when supplying the gas for drying to the first main surface of the separation membrane is less than or equal to 15%, the flow rate distribution being calculated by dividing the difference between a maximum value and a minimum value of a flow rate of the gas for drying in proximity to all first main surface side positions of the separation membrane by the minimum value of the flow rate, wherein the water-soluble gas is at least one of acetylene and $H_2S$, and wherein a content ratio of the water-soluble gas in the gas for drying is greater than or equal to 10 mol %.

* * * * *